May 22, 1945.   M. G. LEONARD   2,376,789
PROTECTIVE DEVICE FOR ELECTRICAL APPARATUS AND SYSTEMS
Filed July 24, 1942
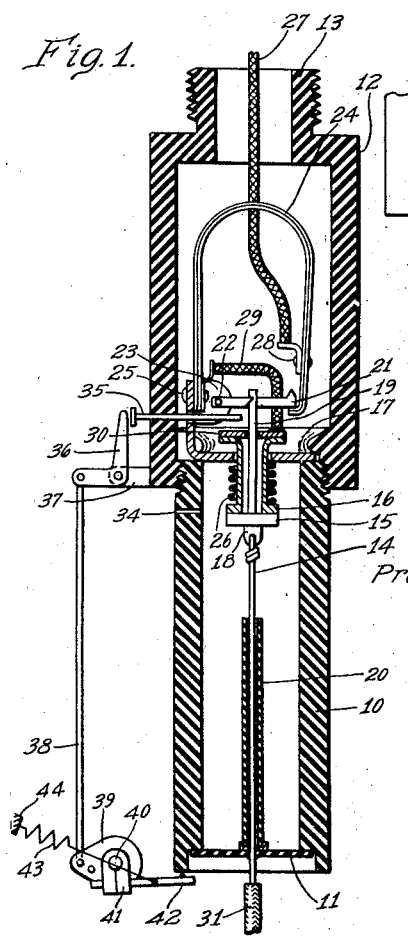
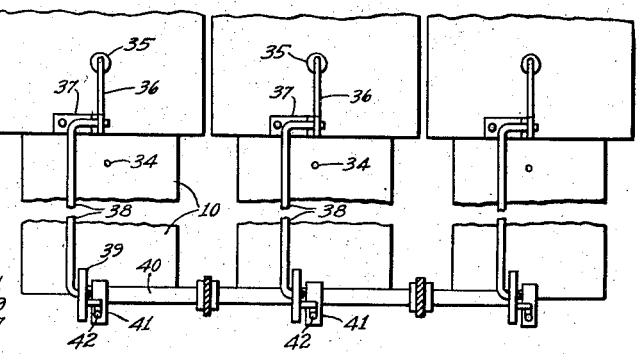
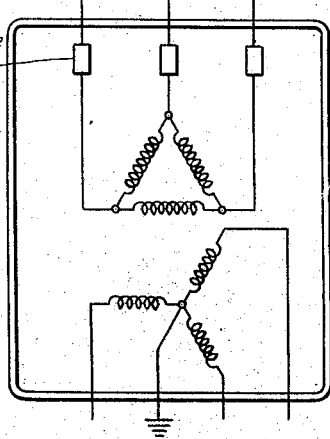
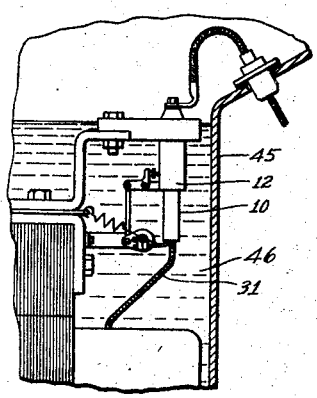
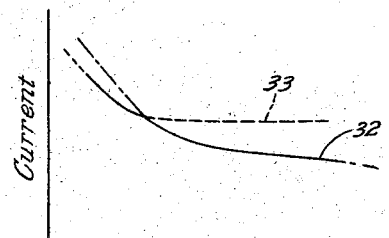
WITNESSES:
INVENTOR
Merrill G. Leonard.
BY
ATTORNEY Patented May 22, 1945

2,376,789

UNITED STATES PATENT OFFICE 2,376,789

PROTECTIVE DEVICE FOR ELECTRICAL APPARATUS AND SYSTEMS

Merrill G. Leonard, Sharon, Pa., assignor to Westinghouse Electric & Manufacturing Company, East Pittsburgh, Pa., a corporation of Pennsylvania Application July 24, 1942, Serial No. 452,180

11 Claims. (Cl. 200—116)

The invention relates, generally, to protective devices for electrical apparatus and systems and, more particularly, to protective links for protecting electrical apparatus against abnormal voltage and current conditions in the system in which it may be connected.

The object of the invention is to provide a protective device for disconnecting electrical apparatus from a system on the development of predetermined electrical conditions which has time current characteristics that are substantially coordinated with the time-current characteristics of the other protective devices connected in the system.

The invention, accordingly, is disclosed in the embodiment thereof shown in the accompanying drawing and comprises the features of construction, combination of elements, and arrangement of parts, which will be exemplified in the construction hereinafter set forth, and the scope of the application of which will be indicated in the claims.

For a fuller understanding of the nature and objects of the invention, reference may be had to the following detailed description, taken in connection with the accompanying drawing, in which:

Figure 1 is a view in vertical section of a protective device constructed in accordance with the features of this invention;

Fig. 2 is a view in section of a portion of a transformer showing how the protective devices may be mounted in relation to the transformer windings;

Fig. 3 is a fragmentary view in side elevation showing a plurality of protective devices and how they may be connected together to protect apparatus in a polyphase system;

Fig. 4 is a diagrammatic view showing how the protective device may be connected in a polyphase transformer circuit; and Fig. 5 is a curve showing the time-current characteristics of the protective device.

Referring now to the drawing and Fig. 1 in particular, the protective device comprises a tubular housing 10 made from some suitable material such as fiber or Micarta having suitable insulating characteristics and capacity to withstand dielectrics. The size of the tube and the thickness of the walls will depend on the operating conditions which the designer is obliged to meet in making his design.

As illustrated the upper end of the tubular housing 10 is provided with an external thread to facilitate the mounting and removal of the protective device for purposes to be described hereinafter. The lower end has a countersunk shoulder for receiving a closure member 11. This closure member may be made from any suitable material such as fiber or Micarta and the thickness will depend on design features.

A second or upper housing 12 also made of fiber or some other suitable insulating material is provided with an internal thread at its lower end for receiving the external thread provided on the upper end of the housing 10. The upper housing 12 is somewhat larger in diameter than the lower housing in order to receive the elements of the protective links as will be described hereinafter. It will also be noted that the upper housing is provided with a neck 13 which has an external thread to facilitate the mounting of the protective device.

A fusible conductor 14 is disposed in the housing 10 between the closure member 11 and a contact member 15 with which it is electrically connected. The contact member 15 is one of a pair of contact members, the upper member 16 of which simulates the shape of a spool. The contact members 15 and 16 may be made from any suitable conducting metal capable of withstanding a certain amount of arcing. Copper would be suitable for making the contact members 15 and 16.

The upper contact member, which is spool shaped, extends through an opening in the plate 17 mounted on the upper end of the housing 10. In mounting the upper contact member 16 it may be projected through the opening in plate 17 when the upper portion is in the form of a cylinder and then spun over to give it the desired shape so that it can move in the opening of the plate 17 and not drop out of it.

As shown in Fig. 1 the lower contact member has a depending boss 18 having an opening therein for receiving the upper end of the fusible conductor 14. A rod 19 is disposed on the upper face of the contact member 15 and extends through the opening of the spool shaped contact member 16, the upper end of this rod has a notch cut in it for a purpose that will appear hereinafter.

A fiber tube 20 may be disposed on the fusible conductor 14. While a tube of this type is not necessary it does cooperate in giving the fusible conductor a predetermined fusing characteristic which for many purposes may be desirable. The fusible conductor and tube described in Patent 2,223,726, issued to J. K. Hodnette December 3, 1940, has been found to be very satisfactory for use in the present protective device.

In order to retain the contact members 15 and 16 in contact with one another, a latching device is provided. This latching device comprises a latch 21 pivotally mounted at 22 on a bracket 23 carried by a vertical member provided on the plate 17. As illustrated the latch is slotted and provided with a V-shaped tongue for engaging in the notch provided in the rod 19.

A U-shaped bimetal member 24 is also carried by the vertical member provided on plate 17. As shown, this bimetal is riveted to the vertical member at 25. The opposite end of the bimetal from that riveted to the vertical member at 25 is provided with an inturned latching portion which engages the latch 21 when the bimetal is subjected only to atmospheric temperatures, and the latch stands in its uppermost position.

For some purposes it may be desirable to have the contact members 15 and 16 make pressure engagement with one another. In order to establish the desired pressure engagement, a spring 26 is disposed on the spool shaped contact member 16 between the contact head and the plate 17. Therefore, when the latch 21 stands in its uppermost position and engages in the notch in the rod 19, the contact members are held in contact with one another and are under a biasing pressure.

As illustrated the bimetal strip 24 is electrically connected to the conductor 27 and 28 and to the conductor 29 at 25 where it is riveted to the vertical member carried by plate 17. The conductor 29 is in turn connected to a plate 30 mounted on the upper end of the contact member 16. This plate may be of some suitable conducting metal and, for example, may be welded to the contact member.

When the protective device is connected in circuit relation with the winding to be protected, an electrical circuit through the protective device is provided which may be traced from conductor 27 through the bimetal 24, conductor 29, plate 30, contact members 15 and 16 when in engagement, fusible conductor 14 and out through the conductor 31. Thus the bimetal is subjected to the heating effect of the current that flows in the circuit. If the U-shaped bimetal member 24 is designed to spread the legs of the U when subjected to a temperature rise, then upon the development of predetermined operation conditions resulting in a predetermined temperature rise, the latch 21 will be released from the bimetal releasing the rod 19.

The biasing spring 26 functions to project the contact members 15 and 16 downwardly until the upper end of the spool shaped contact member 16 engages the plate 17. The weight of the contact member 15 and rod 19 causes the contact member 15 to continue its downward movement effecting a separation of the contact members which will cause a certain amount of arcing with resultant decomposition of the dielectric liquid. In this manner gases are generated and the resultant pressures will force the closure member 11 out of the lower housing 10 interrupting the circuit and performing an operation which will be described hereinafter.

A typical time current curve for a bimetal member designed for predetermined operating characteristics is shown at 32 of Fig. 5. This curve 32 crosses a time current curve 33 which is typical of the fusible conductor 14. Thus the performance of a protective device provided with a bimetal such as 24 and a fusible conductor such as 14 will be given by a curve following the upper portion of the curve 33 and the lower portion of curve 32. The point where the curves 32 and 33 cross will be the junction point of the performance curve that will result.

When the protective device is utilized in a polyphase system one unit should be connected in circuit relation with each phase of the system as shown in Fig. 4. In this particular illustration the protective links are shown as connected only on one side of the apparatus to be protected. If desired the protective links may be connected in the circuit on both sides of the apparatus to be protected.

When a plurality of protective links such as shown in Fig. 4 are employed and a surge causes one of the links to function interrupting the circuit through one phase winding of the apparatus, such for example, a transformer, it is generally desirable that the circuit through the other phases be interrupted immediately.

In utilizing protective links of this type they are usually immersed in the dielectric employed in the electrical apparatus such as transformers, but if not, they may be immersed in a separate container of dielectric. The dielectric will enter the housing 10 through a small opening 34. This opening is made small enough so that when gas is generated as the result of the decomposition of the dielectric by arcing it cannot escape fast enough to have any appreciable effect on the pressures developed. This opening also serves the purpose of permitting gases to escape which may have accumulated in the housing 10.

In order to provide for the operation of one protective link from another, a pin 35 is slidably mounted in the opening of the upper housing 12 in alignment with the rod 19. When this pin is projected horizontally it will hit the rod 19 and disengage it from the latch 21. The lower contact member is then projected downwardly and the device functions in the manner described hereinbefore.

In order to actuate the pin 35, a bell crank 36 is pivotally mounted on a bracket 37 carried by the upper housing 12. As shown the horizontal arm of the bell crank is connected through a rod 38 to a cam 39 keyed to a shaft 40. It will readily be appreciated that the shaft 40 may be rotatably mounted in any suitable bearing housing 41 that may be mounted in the transformer or other electrical apparatus to be protected in some well known manner. A kick plate 42 is rigidly connected to the cam 39 so that when it is actuated downwardly it rotates the cam and the shaft 40. A spring 43 is connected between the kick plate and a support 44 that may be provided on the case 45 of a transformer or other electrical apparatus. As shown the spring retains the kick plate 42 in contact with the lower end of the housing 10. The line of connection between the kick plate and the support 44 is above dead center.

Assuming now that the fusible conductor 14 is fused or the contact members 15 and 16 are separating causing arcing then the dielectric 46 in the transformer is decomposed and gases produced, causing gas pressures which are great enough to blow the closure member 11 out of the housing. The closure member hits the kick plate 42 extending into its path and rotates it clockwise about the axis of the shaft 40. The mechanism is so designed that the blow delivered to the kick plate 42 is great enough to rotate it through a sufficient arc to carry the spring and its connection to the kick plate below dead center. The spring then rotates the shaft further and actuates the bell crank of each protective device.

As pointed out hereinbefore, when the bell crank 36 strikes the pin 35 the rod 19 is released. The contact members 15 and 16 are then separated interrupting the circuit through each protective device. Thus when one protective device functions and the circuit of one phase is interrupted, the other phase winding of the electrical apparatus will be immediately disconnected from the circuit.

In designing the apparatus the bimetal 24 and the protective link 14 will be so selected as to be properly coordinated with the other protective devices in the circuits. The method of coordination of protective devices is described in the Patent 2,223,726 and referred to hereinbefore.

Since certain changes may be made in the hereinbefore described protective device and different embodiments of the invention can be made without departing from the scope thereof, it is intended that all matter contained in the above description or shown in the accompanying drawing shall be interpreted as illustrative and not in a limiting sense.

I claim as my invention:

1. In a protective device for electrical apparatus provided with an electrical winding, in combination, a fusible conductor having predetermined fusing characteristics connected in circuit relation with the winding, a circuit interrupting device connected in circuit relation with the fusible conductor, heat responsive means disposed for latching the circuit interrupting means to maintain a circuit through the fusible conductor, said heat responsive means being subject to operation to unlatch the circuit interrupting device upon the development of predetermined temperatures, thereby to effect an interruption of the circuit upon the development of predetermined operating conditions, the heat responsive device and the fusible conductor serving to give the protective device a predetermined operating characteristic.

2. In a protective device for electrical apparatus provided with polyphase electrical windings, in combination, a fusible conductor having predetermined fusing characteristics connected in circuit relation with each phase of the polyphase electrical windings; a circuit interrupting device connected in circuit relation with each fusible conductor, a bimetal connected in circuit relation with each fusible conductor and disposed to latch the circuit interrupting means connected in phase in closed position, means disposed for operation upon the interruption of a circuit by the fusing of the fusible conductor, and a linkage disposed for operating upon the fusing of any one of the plurality of fusible links for effecting the operation of all of the circuit interrupting devices.

3. In a protective device for electrical apparatus provided with polyphase electrical windings, in combination, a fusible conductor having predetermined fusing characteristics connected in circuit relation with a winding, a circuit interrupting device connected in circuit relation with the fusible conductor, said circuit interrupting device being provided with a plurality of relatively movable contact members, heat responsive means for latching the contact members in engagement, a dielectric in which the fusible conductor and contact members may be immersed, means disposed for operation by the gases of decomposition of the dielectric caused by arcing when either the fusible conductor is fused or the contact members are operated to effect the operation of other protective devices connected in circuit relation with other windings.

4. In a protective device for electrical apparatus provided with polyphase electrical windings, in combination, a fusible conductor having predetermined fusing characteristics connected in circuit relation with a winding, a plurality of contact members connected in circuit relation with the fusible conductor, heat responsive means for latching said contact members in contact with one another, means for tripping the latching means and mechanical means disposed to be actuated by other protective devices for positively operating said tripping means.

5. In a protective device for electrical apparatus provided with polyphase electrical windings, in combination, a fusible conductor having predetermined fusing characteristics connected in circuit relation with a winding, a plurality of contact members connected in circuit relation with the fusible conductor, means for latching the contact members in contact with one another under the pressure of a biasing member and mechanical means disposed for operation by other protective links for tripping the latching means to effect an interruption of the circuit through said contact members.

6. In a protective device for electrical apparatus provided with polyphase electrical windings, in combination, a fusible conductor having a predetermined fusing characteristic connected in circuit relation with a winding, a pair of contact members connected in circuit relation with the fusible conductor, means for latching the contact members in contact with one another, said latching means being responsive to temperature, thereby giving the protective device a characteristic derived from the characteristics of the fusible conductor and the latching means which is responsive to temperature, a dielectric in which the fusible conductor and contact members are immersed and means disposed for operation by another protective link to release the latching means, thereby to interrupt the circuit through the protective link or upon the occurrence of arcing in the dielectric resulting from the fusing of the fusible conductor or the operation of the contact members and resultant generation of the gases by decomposition.

7. In a protective device for electrical apparatus provided with polyphase electrical windings, in combination, a fusible conductor connected in circuit relation with the winding, a tube disposed on the fusible conductor cooperative to give the fusible conductor a predetermined fusing characteristic, a plurality of relatively movable contact members connected in circuit relation with the fusible conductor, means for latching the contacts in contact with one another, the latching means being provided with a bimetal connected in circuit relation with contact members and fusible conductor, said bimetal being responsive to heat, whereby the latching means is tripped upon the development of a predetermined temperature and means for imposing a biasing pressure on the contact members when latched in contact with one another and means for tripping the latching means independently of the bimetal.

8. In a protective device for electrical apparatus provided with polyphase windings, in combination, a fusible conductor connected in circuit relation with a winding, a tube disposed on the fusible conductor cooperative to give it a predetermined fusing characteristic, a plurality of contact members connected in circuit relation with the fusible conductor, means for latching the contact members in contact with one another, said latching means comprising a bimetal strip connected in circuit relation with the fusible conductor and contact members, the bimetal thereby being responsive to current flow and temperatures resulting therefrom, whereby the latching means may be tripped on the development of predetermined operating conditions, a dielectric liquid in which the fusible conductor and contact members are immersed, the dielectric being decomposed upon the occurrence of arcing resulting from the fusing of the fusible conductor or the separation of the contact members when current is flowing and means disposed for operation upon the generation of gases of decomposition for tripping the latching means independently of the bimetal.

9. In a protective device for electrical apparatus provided with polyphase electrical windings, in combination, a fusible conductor connected in circuit relation with a winding, a tube disposed on the fusible conductor cooperative to give it a predetermined fusing characteristic, a plurality of contact members connected in circuit relation with the fusible conductor, means for latching the contact members in contact with one another, the latching means comprising a bimetal trip for retaining the latch in a predetermined position to retain the contact members in contact with one another, the bimetal being connected in circuit relation with the fusible conductor and contact members thereby being responsive to temperatures resulting from the flow of current, means for imposing a biasing pressure on the contact members when they are latched in contact with one another, means disposed for operation to trip the latching means independently of the bimetal, a dielectric in which the fusible conductor and contact members are immersed, the dielectric being subject to arcing resulting from the fusing of the fusible conductor or the separation of the contact members when current is flowing and means disposed for operation upon the generation of a predetermined pressure by the gases of decomposition to effect the operation of said independently disposed latched tripping means.

10. In a protective device for electrical apparatus provided with electrical windings, in combination, a fusible conductor connected in circuit relation with a winding, a tube disposed on the fusible conductor cooperative to give it a predetermined fusing characteristic, a tubular housing for the fusible conductor, a closure for one end of the tubular housing, a plurality of relatively movable contact members connected in circuit relation with the fusible conductor, the contact members being suspended in the tubular housing, the fusible conductor being connected between the lowermost contact member and the closure member, means for latching the contact members in contact with one another, the latching means comprising a bimetal connected in circuit relation with the fusible conductor and the contact members, thereby being responsive to temperatures developed by current flow whereby the latching means may be tripped upon the development of predetermined temperatures in the bimetal and means for imposing a biasing pressure on the contact members when they are latched in contact with one another, said latching means and biasing means being disposed on one end of the tubular housing, a second housing for the latching means, the tubular housing being carried by said housing for the latching means and being removable therefrom to give access to the latching means and means disposed for tripping the latching means independently of the bimetal, a dielectric liquid in which the fusible conductor and contact members are immersed, and means disposed to be actuated by the discharge of the closure member from the end of the tubular housing upon the development of pressures when the dielectric is decomposed by arcing resulting from the fusing of the fusible conductor or the separation of the contact members to operate the independent latch tripping means.

11. In a protective system for electrical apparatus provided with a polyphase electrical winding, in combination, a plurality of protective devices, each protective device comprising a fusible conductor connected in circuit relation with the winding, said fusible conductor having a predetermined fusing characteristic, a plurality of contact members connected in circuit relation with the fusible conductor, means for latching the contact members in contact with one another, the latching means comprising a bimetal strip connected in circuit relation with the fusible conductor and contact members and responsive to temperatures developed by currents flowing through the protective device, means disposed for tripping the latching means independently of the bimetal strip, a dielectric liquid in which the fusible conductor and contact members are immersed, the dielectric being subject to decomposition upon the occurrence of arcing as a result of the fusing of the fusible conductor or the separation of the contact members when current is flowing, and means responsive to the generation of gas pressures as a result of the decomposition of the dielectric liquid for actuating the independent latch tripping means, and means extending between the plurality of protective links disposed to actuate the independent latch tripping means of all of the protective links upon the tripping of the independent latching means of one protective link.

MERRILL G. LEONARD.